(12) United States Patent
Cannon et al.

(10) Patent No.: US 6,968,045 B1
(45) Date of Patent: Nov. 22, 2005

(54) SMART FACSIMILE MACHINE PICK-UP

(75) Inventors: Joseph M. Cannon, Harleysville, PA (US); James A. Johanson, Macungie, PA (US); Philip D. Mooney, Sellersville, PA (US)

(73) Assignee: Agere Systems Inc., Allentown, PA (US)

( * ) Notice: Subject to any disclaimer, the term of this patent is extended or adjusted under 35 U.S.C. 154(b) by 998 days.

(21) Appl. No.: 09/625,179

(22) Filed: Jul. 25, 2000

(51) Int. Cl.[7] .............................................. H04M 11/00
(52) U.S. Cl. ................. 379/93.09; 379/93.05; 379/100.15
(58) Field of Search .................... 379/93.09, 93.05, 379/93.06, 100.05, 100.06, 100.15, 100.16, 379/100.17

(56) References Cited

U.S. PATENT DOCUMENTS 5,337,350 A * 8/1994 Kuwahara .............. 379/100.16

FOREIGN PATENT DOCUMENTS

JP            08-321894     * 12/1996    .......... H04M 11/00

* cited by examiner

Primary Examiner—Melur Ramakrishnaiah

(57) ABSTRACT

An intelligent FAX machine monitors a shared telephone line after another telephone has taken it off-hook. If preliminary signals from a sending FAX machine to another telephone on the same line are detected, then the FAX machine also goes off-hook and tries to establish a link with the sending FAX machine. Presumably the other telephone will hang up. E.g., a telephone answering device (TAD) automatically detects a parallel set going off-hook, causing the TAD to go on-hook. If the parallel telephone is an ordinary telephone, then that user may merely hang up after hearing FAX signals. In another aspect, the FAX machine picks up incoming calls from known FAX machines before a second ring (or before a third ring), based on Caller ID information, so that other pre-configured ring-count telephonic devices such as a telephone answering machine can be operated in an automatic mode with a higher pre-configured ring count.

7 Claims, 7 Drawing Sheets

FIG. 4

KNOWN FAX MACHINE CALLER ID TABLE

| | |
|---|---|
| 402 — SALLY BROWN | — |
| 404 — — | (202) 555-1212 |
| 406 — PATENT LAWYER OFFICE | (202) 887-0336 |
| 408 — BROWN | — |
| 410 — — | (202) 887 ← 360 |
| 412 — — | (202) 887-**** |
| ⋮ | ⋮ |

SMART FACSIMILE MACHINE PICK-UP

BACKGROUND OF THE INVENTION

1. Field of the Invention

This invention relates generally to facsimile machines. More particularly, it relates to methods and apparatus for improving the intelligence of a facsimile machine, particularly with respect to a facsimile machine which is to be operated on a telephone line shared with a separate telephone or other telephonic device.

2. Background

Facsimile (FAX) machines have become an essential communication device in today's offices and homes. In a general sense, FAX machines allow images to be transmitted from one FAX machine for printing at another FAX machine using a respective telephone line to a respective central office of the public switched telephone network (PSTN).

FIG. 6 shows two conventional FAX machines 400*a*, 400*b* communicating over respective telephone lines 410, 412 through the public switched telephone network (PSTN) 400.

In particular, as shown in FIG. 6, each FAX machine 400*a*, 400*b* includes a respective, conventional FAX modem 402*a*, 402*b* which picks-up or takes the respective telephone line 410, 412 off-hook and initiates a handshaking of signals after a predetermined number of rings.

In particular, in operation, one FAX machine, e.g., 400*a*, sends an analog signal representing a facsimile image to the other FAX machine, e.g., 400*b*, using respective FAX modems 402*a*, 402*b*. In the given example, the FAX modem 402*a* of the sending FAX machine 400*a* converts scanned images of document pages into an analog FAX signal, which is appropriately conditioned and transmitted by that FAX modem 402*a* over its respective telephone line 410 to a synchronized and receiving FAX machine 400*b*. The analog FAX signal is switched through the PSTN 400 using digital transmission and other transmission media as necessary. The FAX modem 402*b* of the receiving FAX machine 400*b* converts the transmitted analog signal back into reproduced images for printing.

FIG. 7 shows a conventional method of automatically receiving a FAX message by taking a telephone line off-hook and initiating reception of a FAX message after a predetermined number of ring signals are detected.

In particular, as shown in step 702 of FIG. 7, an incoming call ring signal is detected, and the ring signals are counted in step 704.

Step 706 determines the point at which a pre-configured number of ring signals (e.g., four (4) ring signals) have occurred.

After the predetermined number of ring signals have occurred, the FAX machine answers the incoming call (presuming that the user has not already answered the telephone call at another telephonic device) by controlling a telephone line interface to draw sufficient current from the telephone line to take the telephone line "off-hook", as shown in step 708.

After taking the telephone line off-hook, the receiving FAX machine initiates its part of handshaking with the incoming FAX signal, as shown in step 710.

After the handshaking between sending and receiving FAX machines has accomplished appropriate synchronization, the incoming FAX signal is received and re-imaged (and printed if desired), as shown in step 712.

Many users wish to add a fax machine to an existing voice line so as not to incur the expense of adding a second telephone line for dedicated use by a FAX machine. Using a shared, common telephone line, the user must either set their FAX machine to always answer after a predetermined number of rings, e.g., after a fourth ring. However, this then makes any telephone answering device or central office voice mail on the same telephone line inoperable because they typically operate using the same ring-count principle.

Alternatively, the user must set their FAX machine to only receive when it is started manually by the user when he or she answers the incoming telephone call and recognizes that a fax machine is on the other end. However, this techniques makes a FAX machine inoperable when no one is available to manually start it.

Thus, when a conventional FAX machine shares a telephone line with a separate telephonic device, e.g., a telephone answering system, typically only one of the devices, e.g., either the FAX machine or the telephone answering system, can be placed in an automatic mode wherein automatic answering and reception of an incoming message is automatically initiated and received after a predetermined number of ring signals are detected. This causes an inconvenience and inefficiency in the operation of a home or business with respect to FAX messages and, e.g., voice messages.

Some approaches have been previously undertaken to allow automation of both a FAX machine and another telephonic device (e.g., a telephone answering device).

For instance, some FAX machines can be set to answer on a distinctive ring. However, distinctive ring requires additional service ordered from the relevant telephone company, reducing or eliminating the cost savings associated with sharing a common telephone line. Moreover, the user typically also ends up with an additional phone number associated with the distinctive ring to distribute to would-be senders of FAX messages. Lastly, since a user simply doesn't know which calls will be from a FAX machine, distinctive ringing is not always useful.

Other conventional FAX machines include Caller ID displays (e.g. those available from PANASONIC™ or BROTHER™ to assist a user in determining whether or not activation of FAX reception should be manually initiated either before the pre-configured number of rings if set for automatic reception, or at any time if the FAX machine is set for manual reception.

Yet other conventional FAX machines have a built-in digital telephone answering device (TAD), which can answer and receive an incoming fax or record a voice message based on far end signals. A FAX machine having an integrated telephone answering device may satisfy some customer's needs, but the inclusion of a suitable amount of storage memory and provision of the TAD features typically add significantly to the cost of a system. Moreover, many users already have a separate TAD when purchasing a FAX machine, and prefer to use the original, separate telephone answering device. Furthermore, those who prefer a more advanced (e.g. full featured) TAD than those typically provided as an added feature of a FAX machine, and/or those who subscribe to a central office voice mail service would not be able to take advantage of the integrated TAD feature. These same problems are associated with computer FAX/voice modems which integrate FAX functionality with telephone answering device functionality within the same device.

The present invention frees a FAX machine to operate separately from other devices (e.g., from telephone answering devices), and more intelligently no matter what else may be connected to the telephone service. Eliminating the requirement to integrate a telephone answering device within a FAX machine (or together within a computer) to provide automation for both the FAX machine and another device such as a telephone answering device reduces the costs of the FAX machine.

There is a need for a FAX machine which automatically answers an incoming FAX call, particularly without disabling other telephonic device sharing a common telephone line.

SUMMARY OF THE INVENTION

In accordance with the principles of the present invention, an intelligent FAX machine comprises a monitoring circuit in communication with a telephone line. The monitoring circuit monitors a signal from the telephone line shared with another telephonic device while maintaining an on-hook state with respect to the monitored telephone line. A FAX tone signal detector is in communication with an output of the monitoring circuit. The intelligent FAX machine also includes a FAX modem which is activateable to take the intelligent FAX machine into an off-hook state with respect to the monitored telephone line upon receipt of an activation signal from the FAX tone signal detector.

In accordance with another aspect of the present invention, an intelligent FAX machine comprises a FAX modem, a call related information receiver, and an intelligent FAX pick-up module adapted to activate the FAX modem when call related information is received for an incoming telephone call from a known FAX machine.

A method of interrupting an established telephone call to receive a FAX signal in accordance with yet another aspect of the present invention comprises monitoring a telephone line used to receive the established telephone call for the presence of a FAX tone signal, while maintaining an on-hook condition with respect to the telephone line. An intelligent FAX machine is maintained in an off-hook condition if the FAX tone signal is present on the telephone line.

A method of automatically receiving a FAX signal only from a known FAX source in accordance with still another aspect of the present invention comprises receiving call related information with respect to an incoming telephone call. The received call related information is compared with call related information of a plurality of known FAX machine sources. If a match is determined, a FAX machine is automatically activated to answer the incoming telephone call. Otherwise, if no match is determined, the incoming telephone call is allowed to continue to ring.

BRIEF DESCRIPTION OF THE DRAWINGS

Features and advantages of the present invention will become apparent to those skilled in the art from the following description with reference to the drawings, in which:

FIG. 4 shows an exemplary format and exemplary entries in an exemplary known FAX machine Caller ID table shown also in FIG. 3.

DETAILED DESCRIPTION OF ILLUSTRATIVE EMBODIMENTS

The present invention provides value added intelligence features for FAX devices or data modem devices. A first aspect relates to an intelligent facsimile (FAX) machine which continues to monitor a shared telephone line after another telephonic device has seized the telephone line (i.e., taken the telephone line off-hook). According to this aspect, if the intelligent FAX machine detects the transmission of preliminary or other handshaking signals from a sending FAX machine to the another telephonic device (e.g., a telephone) on the same telephone line, then the intelligent FAX machine also goes off-hook and tries to establish a link with the sending FAX machine. Presumably the other telephonic device will hang up or go back on-hook after the intelligent FAX machine automatically picks up.

Another aspect of the present invention adds to a FAX machine the intelligent capability of answering an incoming call after detection of a first ring and reception of call related information (e.g., Caller ID information). The intelligent FAX machine preferably picks up incoming calls from known FAX machines after receipt of the call related information (e.g., before a second ring in the U.S., before a first ring in some countries), so that other pre-configured ring-count telephonic devices such as a telephone answering machine can be operated in an automatic mode with a higher pre-configured ring count (e.g., set to answer after four (4) rings).

Figure 1:
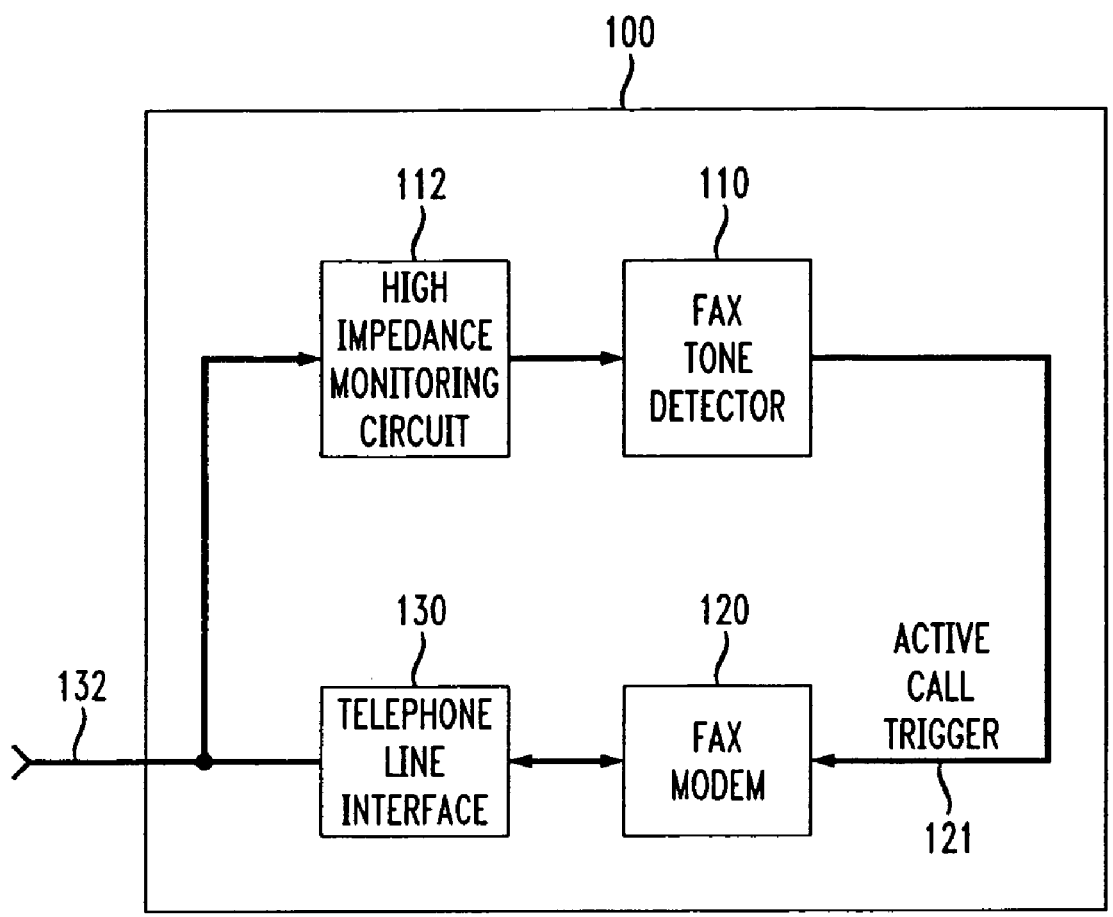
FIG. 1 shows an intelligent FAX machine including a high impedance monitoring circuit and FAX tone detector for automatically detecting a FAX signal in a telephone call answered by another telephonic device using a shared, common telephone line, and for automatically triggering initiation of the reception of the FAX signal, in accordance with a first embodiment of the present invention.

FIG. 1 shows the relevant front end portion of an intelligent FAX machine including a high impedance monitoring circuit and FAX tone detector for automatically detecting a FAX signal in a telephone call answered by another telephonic device using a shared, common telephone line, and for automatically triggering initiation of the reception of the FAX signal, in accordance with a first embodiment of the present invention.

In particular, as shown in FIG. 1, the front end of an intelligent FAX machine 100 includes an appropriate telephone line interface 130 similar to those otherwise conventionally disposed in FAX machines.

A FAX modem 120 is in communication with the telephone line interface 130. The FAX modem 120 synchronizes with a sending FAX machine to receive a FAX signal, as is known in the art. However, in accordance with this aspect of the present invention, the FAX modem 120 includes an active call trigger input 121 which, when activated, causes the FAX modem to instruct the telephone line interface 130 to take the telephone line 132 off-hook and initiate a handshaking and synchronization with a sending FAX machine.

The intelligent FAX machine 100 further includes a high impedance monitoring circuit 112 in communication with the telephone line 132.

The high impedance monitoring circuit 112 monitors the telephone line 132 while the telephone line 132 is in an off-hook condition. Thus, depending upon the impedance of the other telephone device which initially answered the incoming telephone call, the high impedance monitoring circuit 112 may draw an amount of available current within the local requirements for maintaining an off-hook condition on the telephone line 132. However, to ensure compliance with local requirements, it is preferred that the high impedance monitoring circuit have a suitably high impedance to cause only a very low current draw from the telephone line 132.

The output of the high impedance monitoring circuit 112 is fed to a FAX tone detector 110. The FAX tone detector 110 determines the presence of a FAX signal on the telephone line 132. If a FAX signal is present on the telephone line 132, the FAX tone detector 110 activates the active call trigger 121, which is input to the FAX modem 120 to automatically initiate and attempt reception of the detected FAX signal.

Figure 2:
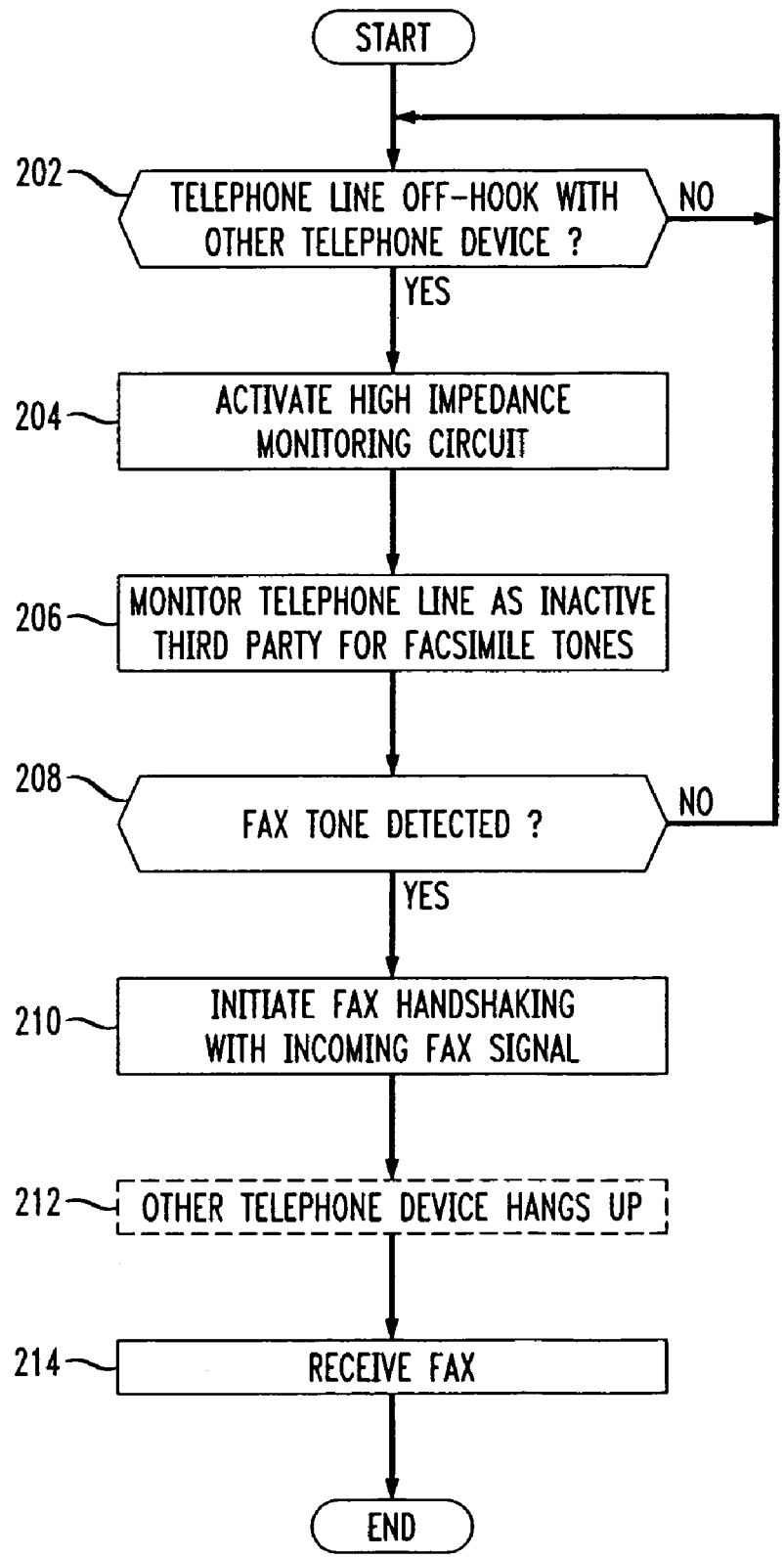
FIG. 2 shows an exemplary process for automatically initiating and receiving a FAX signal in an already-established telephone call between a calling party and another telephonic device using a shared, common telephone line, in accordance with the first embodiment of the present invention.

FIG. 2 shows an exemplary process for automatically initiating and receiving a FAX signal in an already-established telephone call between a calling party and another telephonic device using a shared, common telephone line, in accordance with the first embodiment of the present invention.

In particular, as shown in step 202 of FIG. 2, an intelligent FAX machine 100 such as that shown in FIG. 1 determines if the telephone line 132 is already off-hook with another telephone device on the same telephone line 132. If not, the intelligent FAX machine 100 will enter a loop wherein it will answer an incoming telephone call in a default manner (e.g., after a pre-configured number of rings).

However, if the telephone line 132 is off-hook with another telephone device as determined by step 202, in step 204 the high impedance monitoring circuit 112 may be activated (if not already activated, e.g., at start up of the intelligent FAX machine 100).

In step 206, the telephone line 132 is monitored for the presence of FAX tones by the intelligent FAX machine 100 as an inactive (i.e., on-hook) third party. Importantly, the telephone line interface of the intelligent FAX machine 100 remains on-hook during the monitoring process. Thus, the intelligent FAX machine 100 will remain isolated from other devices using the telephone line 132 minimally affecting their operation, if at all.

In step 208, it is determined whether or not a FAX tone signal has been detected. Any suitable frequency detection algorithm or process may be implemented to sense for the presence of the frequencies commonly associated with a FAX signal. If no FAX tone signal has been detected, then the process shown in FIG. 2 loops around.

Otherwise, as shown in step 210, if a FAX tone signal was detected, the telephone line interface of the intelligent FAX machine will be placed in an off-hook condition, adding the active presence of the intelligent FAX machine 100 to the telephone line 132. Thereafter, the intelligent FAX machine 100 will initiate a handshaking of FAX signals with the sending FAX machine in an attempt to synchronize with and receive the transmitted FAX signal.

If desired, the other telephone device which initially answered the incoming FAX call may hang up. For instance, if a user initially picks up an incoming telephone call only to discover that it is a FAX call, they may hang up after they hear active participation in the FAX handshaking by the local intelligent FAX machine.

An intelligent FAX machine in accordance with the principles of the present invention will work equally well with a conventional FAX machine as a sending device as it will with another intelligent FAX machine as a sending device.

In step 214, if the handshaking successfully linked the intelligent FAX machine 100 with the sending FAX machine, then the FAX signal will be received, re-imaged, and printed if desired.

Thus, in accordance with this aspect of the present invention, an intelligent FAX machine 100 will otherwise operate in a conventional fashion (e.g., answering after a pre-configured number of rings). However, when an on-hook line monitoring circuit senses an incoming phone call and then detects an off-hook condition activated by a parallel set, it monitors the signal on the telephone line using a high impedance circuit so as not to trip the other device's parallel set detector. If the high impedance line monitoring circuit determines that a FAX signal is being sent from the far end, it would take the intelligent FAX machine off-hook and begin trying to handshake with the far end sending FAX machine. If the parallel telephone device is a telephone answering device (TAD) or other automated device, that other telephone device may automatically detect that a parallel set has gone off hook, as is conventional in most TADs, causing the TAD to go back on-hook. If the parallel telephone device is the user at a telephone, then that user may merely hang up after hearing the FAX handshaking.

Using an intelligent FAX separate from a telephone answering device or other automatic device, a user is able to place the FAX machine in a different room or even well out of the way and still enjoy the luxuries of automated FAX reception at the same time as telephone answering device voice message reception using the same shared telephone line because the user would not need to have easy access to a manually set FAX machine as is required when conventionally used on a same telephone line as an automated telephone answering device or other automated telephonic device. Moreover, even if no one is available to answer an incoming telephone call and an automated TAD using the same telephone line instead picked-up the telephone line, the intelligent FAX machine would nevertheless still go off-hook after detecting the presence of a FAX signal, forcing an automated TAD to terminate, thus receiving the incoming FAX signal.

To foster the termination of a TAD device under such circumstances, it may be desirable to include a short pause before (and perhaps after) the outgoing greeting message (OGM) to allow the FAX tone detector 110 of the intelligent FAX machine 100 to detect the presence of the initial FAX signal without being talked-down.

Figure 3:
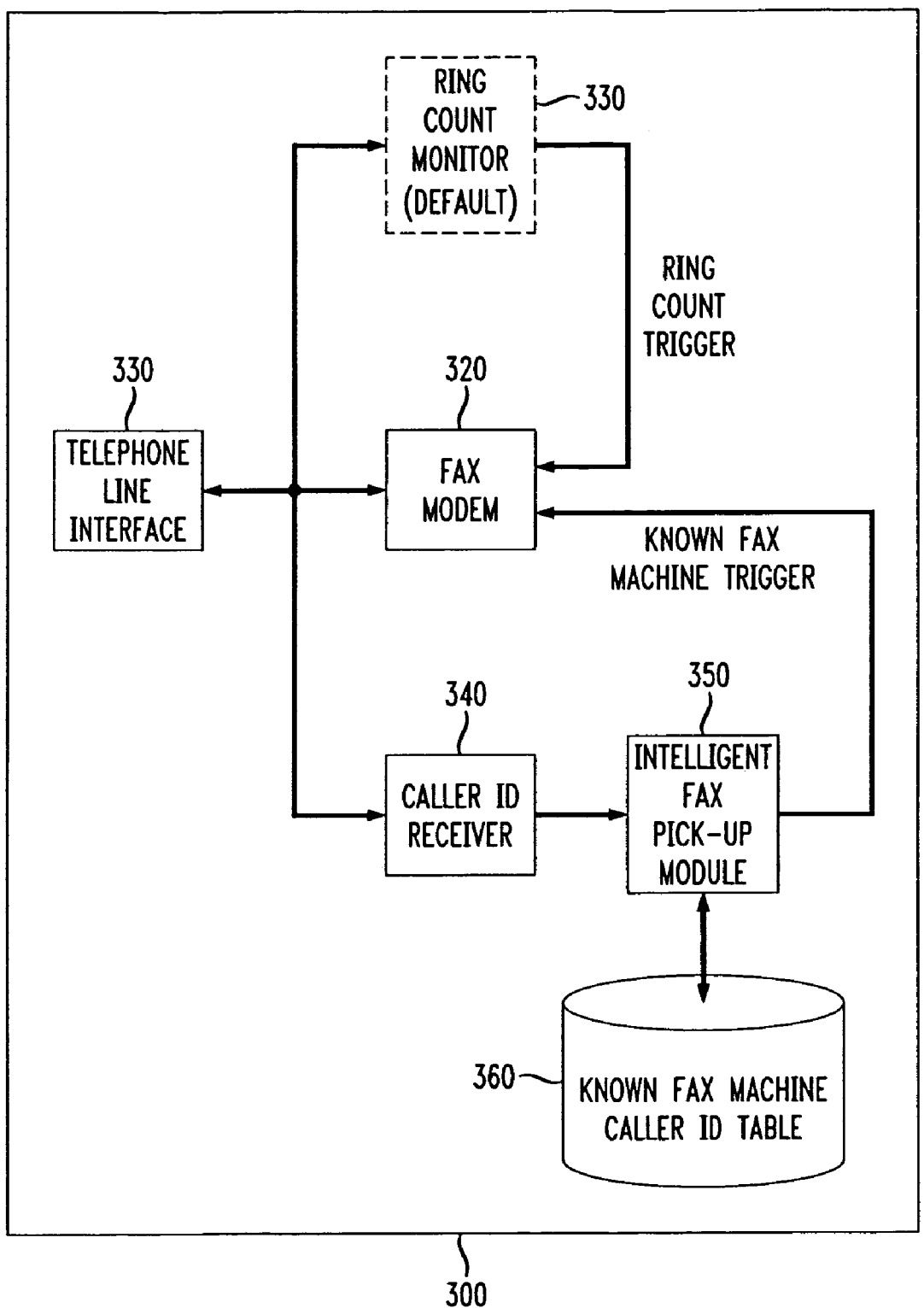
FIG. 3 shows an intelligent FAX machine which automatically answers an incoming telephone call from a known FAX machine based on a match between received Caller ID information and an entry in a known FAX machine Caller ID table after a first ring and before a ring count pre-configured in other automatic devices using the shared telephone line, in accordance with another embodiment of the present invention.

FIG. 3 shows an intelligent FAX machine which automatically answers an incoming telephone call from a known FAX machine based on a match between received Caller ID information and an entry in a known FAX machine Caller 1D table after a first ring and before a ring count pre-configured in other automatic devices using the shared telephone line, in accordance with another embodiment of the present invention.

In particular, FIG. 3 shows an exemplary architecture of an intelligent FAX machine 300 which is provided with the capability of answering or not answering an incoming telephone call based on a match between call related information (e.g., Caller ID information) of known FAX machines and received call related information, e.g., Caller ID information, relating to the identity of an incoming telephone call.

If a telephone call is received from a FAX machine on a known dedicated FAX line, the inventive features allow the intelligent FAX machine 300 to automatically answer the incoming call before a default ring count is reached for any automated device using the telephone line (e.g., the default setting of the intelligent FAX machine 300, a separate automated telephone answering device set to pick up after a pre-configured number of rings, etc.) and/or without requiring manual activation.

In the case where the intelligent FAX machine 300 shares the same line as voice calls but the user might receive a FAX from known FAX machines, e.g., from dedicated FAX lines, the intelligent FAX machine 300 may be enabled to automatically answer calls from known FAX machines. Of course, faxes from unknown sources can still be received manually, in accordance with the first aspect of the present invention shown in FIGS. 1 and 2, or after a pre-configured number of ring signals in an otherwise conventional fashion.

As shown in FIG. 3, the intelligent FAX machine 300 includes a conventional telephone line interface 330, in communication with a FAX modem 320. The FAX modem 320 may include an activation input from an otherwise conventional source such as an optional ring count monitor 330. The ring count monitor 330 counts the number of ring signals associated with a particular incoming call, and activates the ring count trigger to the FAX modem 320 after the occurrence of the pre-configured ring number (e.g., after four (4) rings).

However, the FAX modem 320 also includes an activation input from an intelligent FAX pick-up module 350. The intelligent FAX pick-up module 350 may be an appropriate program operating on a suitable processor (e.g., a microprocessor, microcontroller, or digital signal processor (DSP)), or may be an ASIC or other similar device.

The intelligent FAX machine 300 further includes a call related information receiver, e.g., a Caller ID receiver 340. Caller ID provides the capability of receiving call related information from a central office relating to the identity of a calling party. Using Caller ID, generally a caller's telephone number and/or household name is transmitted by the telephone company to the customer. Using Type I service, the Caller ID information is transmitted during the silent interval between the first two rings in an on-hook condition. Type II Caller ID receives Caller ID information in an off-hook condition (e.g., Call Waiting).

In accordance with this aspect of the present invention, the intelligent FAX pick-up module 350 compares call related information, e.g., Caller ID information, with information contained in entries in a known FAX machine Caller ID table 360.

The compared information may relate to all or a portion of the Caller ID information. For instance, only a name may be compared for a match, or only a telephone number may be compared for a match.

In a more advanced application, only a portion of a name and/or a portion of a telephone number may be compared for a match. Either a complete (i.e., 100%) match may be searched for, or even a 'close' match may be defined (e.g., above 90% matching).

FIG. 4 shows an exemplary format and exemplary entries in an exemplary known FAX machine Caller ID table shown also in FIG. 3.

In particular, as shown in FIG. 4, the known FAX machine Caller ID table 360 can contain any number of entries 402–412 using any suitable format, e.g., in a database format using ASCII characters.

Exemplary entries include a first entry 402 including only a name "Sally Brown" for searching by the intelligent FAX pick-up module 350, with no searchable telephone number. Accordingly, a match is found if the Caller ID name received with respect to an incoming telephone call includes the phrase "Sally Brown".

An exemplary second entry 404 includes only a telephone number "(202) 555-1212", and would be the basis for a match if only the telephone number matches the telephone number of incoming Caller ID information.

An exemplary third entry 406 includes both the name and telephone numbers for complete searching.

An exemplary fourth entry 408 includes only a portion of a name, e.g., only the family name "Smith", which will cause a match for all "Smiths" that call.

An exemplary fifth entry 410 includes only a portion of a telephone number, e.g., the area code and exchange number "(202) 887", which will cause a match for all incoming telephone calls from the relevant exchange number.

An exemplary sixth entry 412 shows that wildcard can be utilized to properly justify the search string. For instance, as shown in FIG. 4, only the area code and exchange number "(202) 887" are searched, but numbers are required to be located in the matching incoming Caller ID information in the positions of the wildcard characters "*".

As shown there is no particular relevance or importance to the ordering of the entries in the known FAX machine Caller ID table 360. However, it is within the principles of the present invention to place a priority or other importance on the entries, and ordering the entries in the known FAX machine Caller ID table 360 accordingly.

Entries in the known FAX machine Caller ID table 360 can be established in any suitable fashion. For instance, a user may program the relevant information (e.g., a full or partial household name and/or a full or partial telephone number).

Alternatively, the user may direct the intelligent FAX machine 300 to store current Caller ID information while receiving an incoming FAX signal from a FAX machine not known to be present as an entry in the known FAX machine Caller ID table 360.

The known FAX machine Caller ID table 360 can alternatively be intelligently programmed based on a history of received FAXes. For instance, when a FAX signal is received by the intelligent FAX machine 300, a search of the known FAX machine Caller ID table 360 may be automatically performed without specific instruction from the user at the time to see if a suitable entry already exists in the known FAX machine Caller ID table 360. If not, the intelligent FAX machine 300 may automatically make a suitable entry including Caller ID information received with respect to the FAX message currently being received. Of course, the intelligent FAX machine 300 may prompt the user for confirmation to add an appropriate entry to the known FAX machine Caller ID table 360. If a match is found in the known FAX machine Caller ID table 360, then no further action need be automatically performed.

Even more intelligence may be added to the intelligent FAX pick-up module 350 as desired. For instance, automatic creation of new entries in the known FAX machine Caller ID table 360 may be made only after a configured number of FAX messages have been received from a same source, e.g., after five (5) FAX messages have been received from a same sending FAX machine. In this way the known FAX machine Caller ID table 360 can be automatically filled with the relevant call related information of only those FAX machines which either communicate with the intelligent FAX machine 300 most frequently and/or are more likely to be dedicated for FAX use with reduced likelihood that a voice call will be received from the same telephone number.

Another advanced intelligence feature which may be implemented in the intelligent FAX pick-up module 350 as the maintainer of the known FAX machine Caller ID table 360 is the automatic (or prompted) removal of an entry in the known FAX machine Caller ID table upon detection of a voice signal from a source bearing matching Caller ID information.

Yet another feature of advanced intelligence which may be implemented in the intelligent FAX pick-up module 350 is the logging of a number of FAX calls and/or number of voice calls emanating from a particular source, and suitably entering, maintaining, or deleting a matching entry from the known FAX machine Caller ID table 360.

Figure 5:
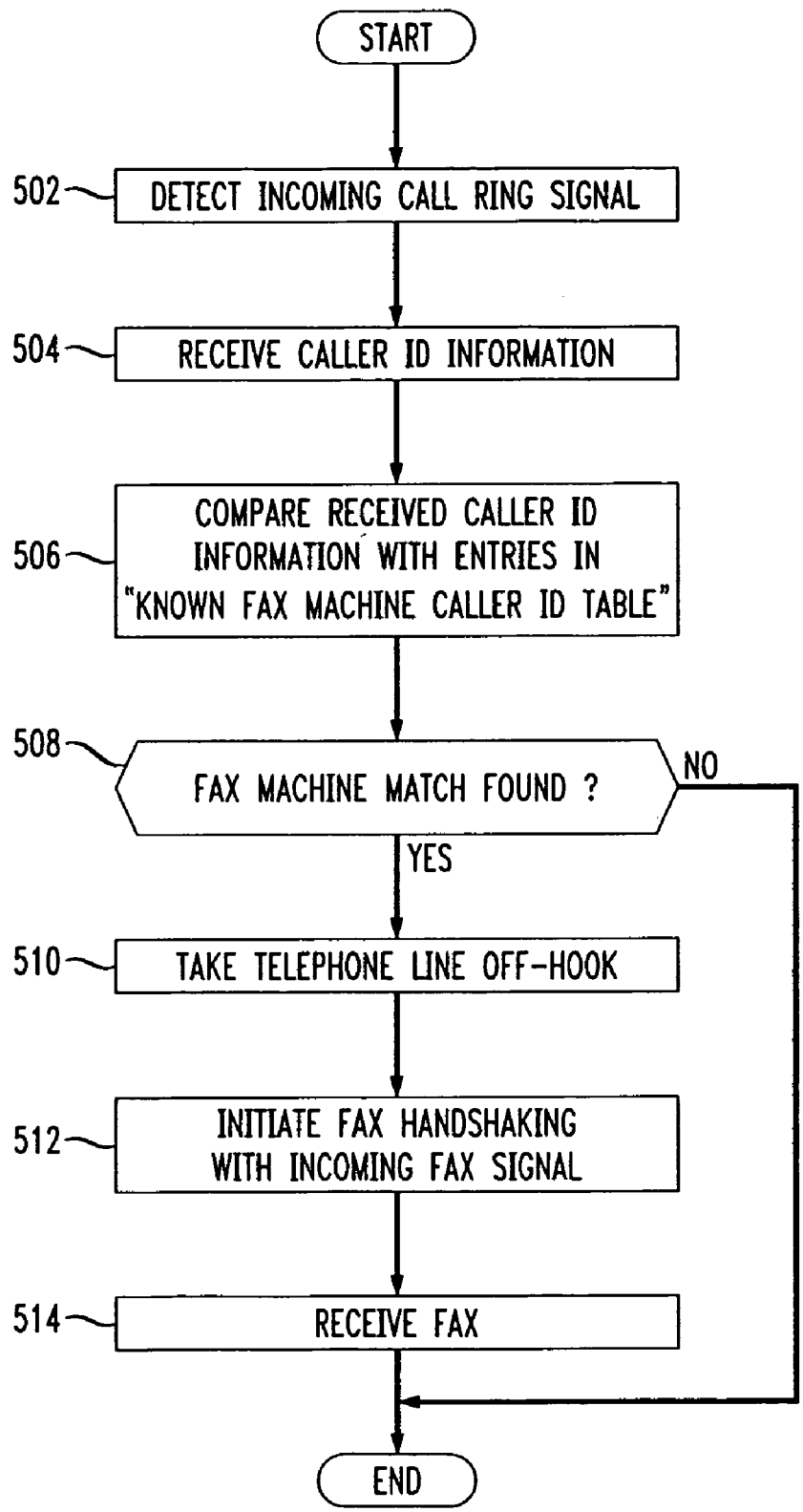
FIG. 5 shows an exemplary process for automatically initiating and receiving a FAX signal after a first ring but before a ring count pre-configured in other automatic devices using a shared telephone line received from a known FAX machine based on a match between received Caller ID information and an entry in a known FAX machine Caller ID table, in accordance with an aspect of the present invention.
Figure 6:
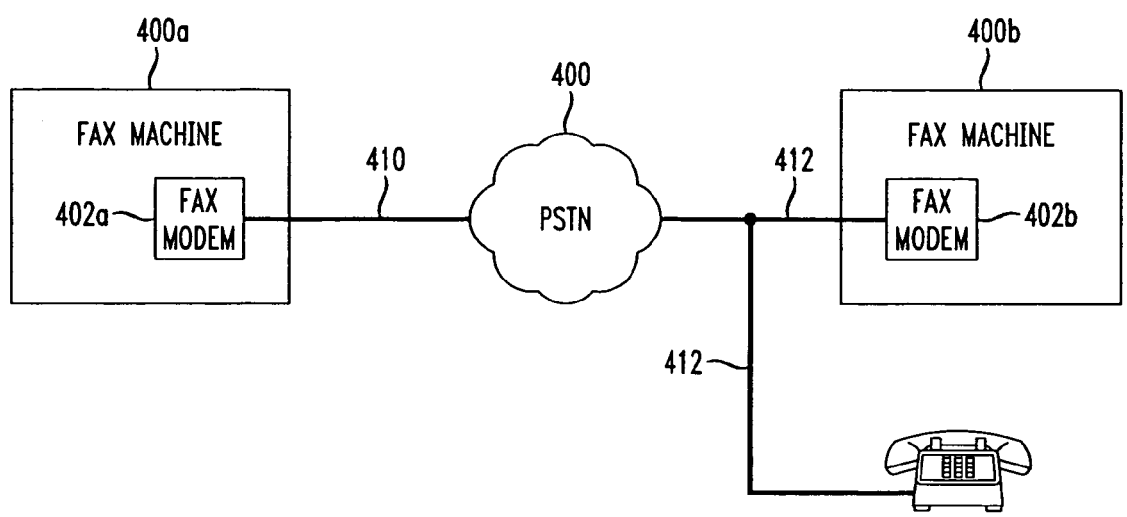
FIG. 6 shows two conventional FAX machines communicating over respective telephone lines through the public switched telephone network (PSTN).
Figure 7:
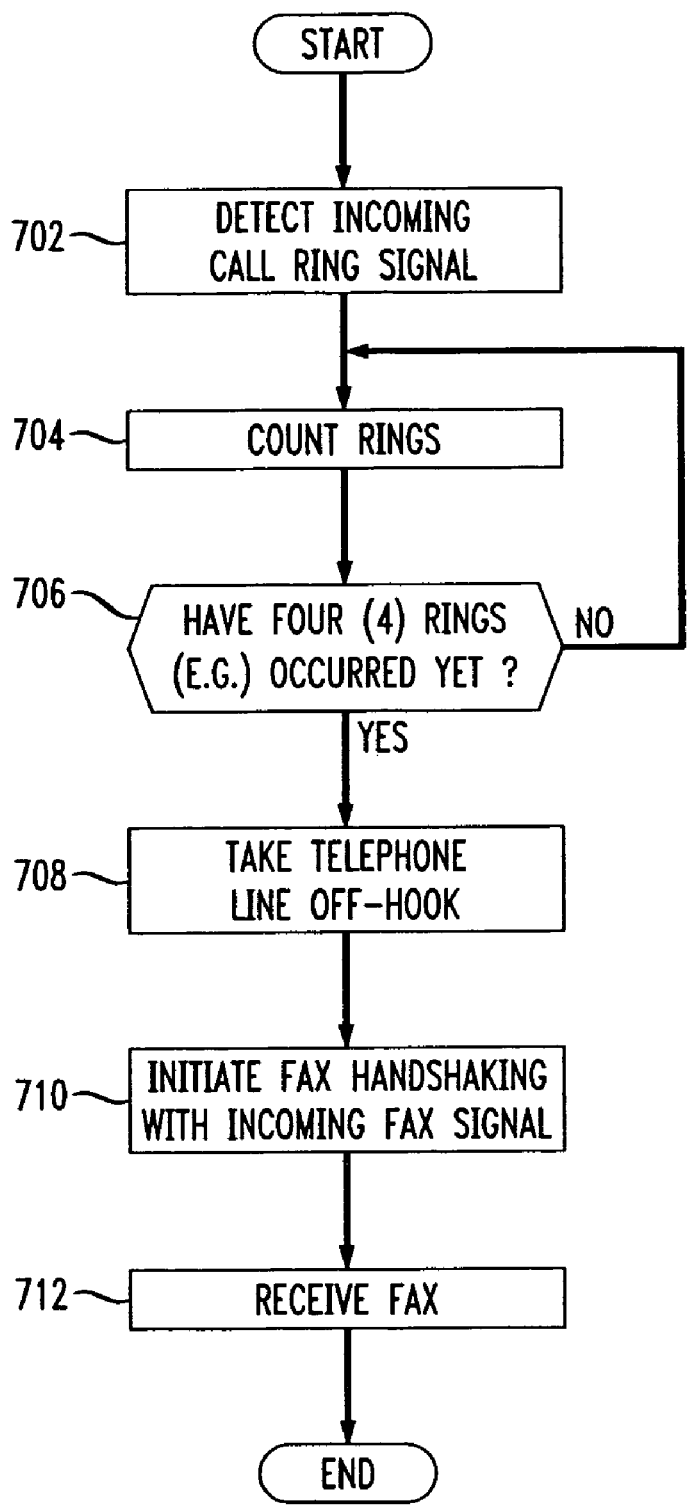
FIG. 7 shows a conventional method of automatically receiving a FAX message by taking a telephone line off-hook and initiating reception of a FAX message after a predetermined number of ring signals are detected.

FIG. 5 shows an exemplary process for automatically initiating and receiving a FAX signal after a first ring but before a ring count pre-configured in other automatic devices using a shared telephone line received from a known FAX machine based on a match between received Caller ID information and an entry in a known FAX machine Caller ID table, in accordance with an aspect of the present invention.

In particular, as shown in step 502 of FIG. 5, the intelligent FAX machine 300 detects the presence of an incoming call ring signal in an otherwise conventional fashion.

In step 504, call related information (e.g., Caller ID information) is received, e.g., between the first and second ring signals.

In step 506, received Caller ID information relating to the incoming telephone call is compared with each entry 402–412 in the known FAX machine Caller ID table 360.

In step 508, the intelligent FAX pick-up module 350 determines whether or not a match with a known FAX machine source has been found. If not, the process ends.

However, if a match with a known FAX machine has been found, the intelligent FAX machine 300 takes its telephone line interface 330 off-hook as shown in step 510, initiates a FAX signal handshaking with the incoming FAX signal as shown in step 512, and receives the transmitted FAX as shown in step 514.

This aspect of the invention is particularly useful for telephone lines wherein a user has subscribed to a centralized voice mail system (e.g. from the telephone company). In such cases, if a conventional FAX machine is set for automatic answer after, e.g., four (4) rings, the voice mail system would never get any messages.

In accordance with another aspect of the present invention, a centralized voice mail system could also provide use of the invention by allowing FAX numbers to be programmed in. It would then never interfere with FAX calls and send them on through to the end user. New numbers can be added to the list of dedicated FAX lines by activating an appropriate button or other user interface command on the intelligent FAX machine after manually activating a FAX receive process.

For example, the following dedicated FAX numbers can be programmed in the known FAX machine Caller ID table 360 for immediate answer: a husband's work FAX number, a wife's work FAX number, a broker's FAX number, a travel agent's FAX number, a realtor's FAX number, a confirmation FAX back service, Veschi's Pizza FAX line (for weekly lunch specials), etc. Then, when an incoming telephone call has Caller ID information which matches any of these pre-programmed entries in the known FAX machine Caller ID table 360, the intelligent FAX machine 300 can pick-up the call after the first ring so that others at the home or office need not worry about getting up and answering the telephone.

In accordance with the principles of the present invention, an intelligent FAX machine and one or more separate telephonic devices (e.g., a telephone answering device) may all be placed in an automatic pick-up mode, eliminating the need for an additional telephone line or for the subscription to an additional service such as distinctive ring purchased from the relevant telephone company.

The present invention provides numerous advantages over conventional FAX machines. For instance, an intelligent FAX machine 100, 300 in accordance with the principles of the present invention provides additional automation to the FAX receiving process, thus requiring less user intervention in the reception of FAX messages. Marketing value is increased in an integrated chip set which implements the FAX reception intelligence as described. Moreover, the automated reception of FAX messages on a telephone line shared with other devices provides convenience for occasional FAX users without requiring the installation of an additional telephone line and/or distinctive ring service. Missed FAX messages are avoided in the situation when another person answers another telephone using the shared telephone line. Very importantly, the present invention allows for automation of a FAX machine in a receive mode when utilizing a common telephone line shared with another automated device set to pick-up after a pre-configured number of rings, e.g., with a telephone answering device, or when utilizing a data modem and/or a subscription to a central office voice mail service.

While the invention has been described with reference to the exemplary embodiments thereof, those skilled in the art will be able to make various modifications to the described embodiments of the invention without departing from the true spirit and scope of the invention.

What is claimed is:

1. An intelligent FAX machine, comprising:
   a monitoring circuit in communication with a telephone line, said monitoring circuit adapted to monitor a signal from said telephone line shared with another telephonic device while maintaining an on-hook state with respect to said monitored telephone line;
   a FAX tone signal detector in communication with an output of said monitoring circuit; and
   a FAX modem activateable to take said intelligent FAX machine from said on-hook state to an off-hook state simultaneously with said another telephonic device already in an off-hook state with respect to said monitored telephone line upon receipt of an activation signal from said FAX tone signal detector.

2. The intelligent FAX machine according to claim 1, wherein:
   said monitoring circuit has sufficiently high impedance so as to avoid off-hook detection by another device on a common telephone line.

3. The intelligent FAX machine according to claim 1, further comprising:

a telephone line interface between said monitoring circuit and said telephone line.

4. A method of interrupting an established telephone call to receive a FAX signal, comprising:

monitoring a telephone line used to receive said established telephone call for a presence of a FAX tone signal, while maintaining an on-hook condition with respect to said telephone line; and taking an intelligent FAX machine from said on-hook condition to an off-hook condition on said telephone line simultaneously with another telephone already in an off-hook condition, if said FAX tone signal is present on said telephone line.

5. The method of interrupting an established telephone call to receive a FAX signal in accordance with claim 4, further comprising:

activating a high impedance monitoring circuit for performing said step of monitoring.

6. Apparatus for interrupting an established telephone call to receive a FAX signal, comprising:

means for monitoring a telephone line used to receive said established telephone call for the presence of a FAX tone signal, while maintaining an on-hook condition with respect to said telephone line; and means for taking an intelligent FAX machine from an on-hook condition to an off-hook condition on said telephone line simultaneously with another telephone already in an off-hook condition, if said FAX tone signal is present on said telephone line.

7. The apparatus for interrupting an established telephone call to receive a FAX signal in accordance with claim 6, further comprising:

means for activating a high impedance monitoring circuit for performing said step of monitoring.

* * * * *